United States Patent [19]
Tonks

[11] Patent Number: 5,317,867
[45] Date of Patent: Jun. 7, 1994

[54] CHANGEOVER VALVE

[75] Inventor: Robert C. Tonks, Bridgewater, England

[73] Assignee: Rolls-Royce plc, London, England

[21] Appl. No.: 982,723

[22] Filed: Nov. 27, 1992

[30] Foreign Application Priority Data

Nov. 27, 1991 [GB] United Kingdom ............... 9125225

[51] Int. Cl.[5] .............................................. F02K 1/38
[52] U.S. Cl. .................................... 60/226.3; 60/262; 60/39.07
[58] Field of Search ................ 60/226.1, 226.3, 262, 60/39.07; 137/15.1, 15.2

[56] References Cited

U.S. PATENT DOCUMENTS

| | | | |
|---|---|---|---|
| 3,854,286 | 12/1974 | Klees | 60/226.1 |
| 4,038,818 | 8/1977 | Snell | 60/226.3 |
| 4,086,761 | 5/1978 | Schaut et al. | 60/262 |
| 4,587,803 | 5/1986 | Nightingale et al. | 60/226.1 |
| 4,979,363 | 12/1990 | Hitchcock et al. | |
| 5,129,225 | 7/1992 | Tonks | 60/226.3 |

FOREIGN PATENT DOCUMENTS

0412736A1 2/1991 European Pat. Off. .

Primary Examiner—Richard A. Bertsch
Assistant Examiner—Michael I. Kocharov
Attorney, Agent, or Firm—Oliff & Berridge

[57] ABSTRACT

A changeover valve for a tandem fan type of engine is located in a duct between fan stages at either end. The valve arrangement has a butterfly flap valve to selectively obstruct flow along the cut, a drop-down chute to eject front fan flow and secondary inlet means to induct air to the second fan stage to supply the core engine. The secondary inlet means comprises drop-in doors hinged to pivot into the duct behind the flap valve. A tertiary airflow in a space defined by the duct and an engine nacelle is admitted to the region at the second fan entry face which is shadowed by the secondary inlet doors.

6 Claims, 4 Drawing Sheets

CHANGEOVER VALVE

BACKGROUND OF THE INVENTION

1. Field of the Invention

The invention relates to changeover valves for controlling fluid flow in a duct. In particular, the invention provides a changeover valve for installation in the intake duct of a variable cycle engine for a supersonic transport propulsion engine.

2. Description of Related Developments

An environmentally acceptable, and therefore commercially acceptable, propulsion unit for a second generation of supersonic transport aircraft must meet stringent noise regulations at take-off. To meet these requirements the engine configuration preferred currently is a variable cycle engine. Such an engine can meet the low noise requirements and, when demanded, product the high specific thrust needed for transonic acceleration. SST engine studies have concluded that a tandem fan type of engine is best suited to this role.

In a first, or parallel mode, the entire flow from the front fan is directed overboard and a secondary intake supplies air to a rear fan feeding directly to the engine core. This configuration is used during take-off, landing and subsonic flight to reduce noise levels. In effect, the engine in this configuration possesses a high bypass ratio, and low specific thrust.

For transonic and supersonic flight the engine is switched over to its second, or series, mode in which the changeover valve no longer dumps front fan airflow overboard. Instead it directs it to the rear fan thereby supercharging the core engine. Effectively this produces a low bypass ratio, high specific thrust engine possessing high cruise efficiency. This configuration is used where noise consideration are of a lesser concern.

A tandem fan engine of the type referred to is characterised by having an additional low pressure (LP) fan stage positioned ahead of a core engine with a changeover valve located in the intake duct in front of the engine but downstream of the additional fan. The changeover valve has to be capable of switching two engine airflows simultaneously, to allow the engine to changeover from operating in either of the two modes to operating in the other.

A valve of this type is described in our published European Patent Application No. EP 0412736A1. The changeover valve of that application essentially comprises a butterfly valve adapted to operate in an annular duct.

The secondary inlet and outlet arrangements are critical to efficient operation of this type of device. The simple arrangements disclosed in the earlier publication produce considerable turbulence. The secondary inlet is especially important in this respect since, in the parallel mode of operation, it is this airflow which enters the core engine. The present invention seeks to provide a solution to this problem.

The present invention has for a major objective to provide a secondary inlet arrangement which can supply flow with maximum efficiency to the core engine.

According to one aspect of the present invention there is provided a changeover valve for controlling flow in a duct comprising:

valve means for stemming flow along the duct;

secondary outlet means upstream of the valve means and operative in synchronism therewith to exhaust flow entering one end of the duct when said valve means blocks flow along the length of the duct;

secondary inlet means downstream of the valve means and operative in synchronism therewith a admit a secondary flow into the duct when said valve means blocks flow along the length of the duct;

said inlet means being formed by at least one aperture in a wall defining the duct and having closure means adapted for closing said at least one aperture, the closure means being hinged at an upstream edge to open into the duct.

Preferably, the secondary inlet arrangement includes inwardly hinged non-scoop doors located on opposite sides of the flow duct.

Preferably, the changeover valve further includes provision for a tertiary flow into the region behind the secondary inlet door or doors.

BRIEF DESCRIPTION OF THE DRAWING

One exemplary embodiment of the invention will now be described with reference to the accompanying drawings, in which.

DETAILED DESCRIPTION OF PREFERRED EMBODIMENTS

Figure 1:
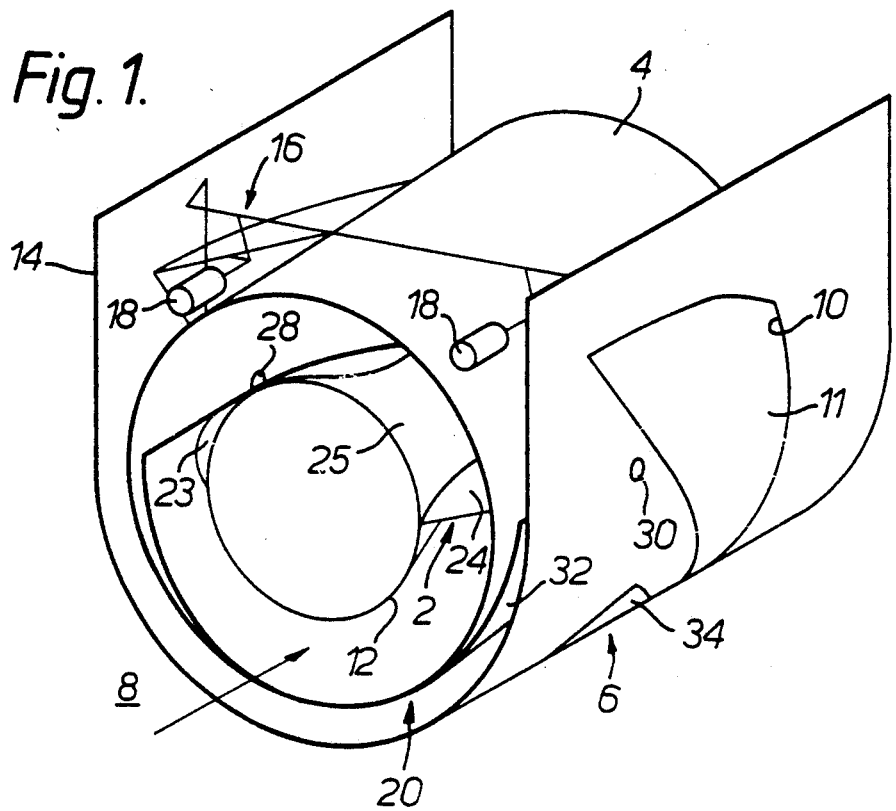
FIG. 1 shows an isometric view of a diverter valve for a tandem fan engine in the series flow position.
Figure 2:
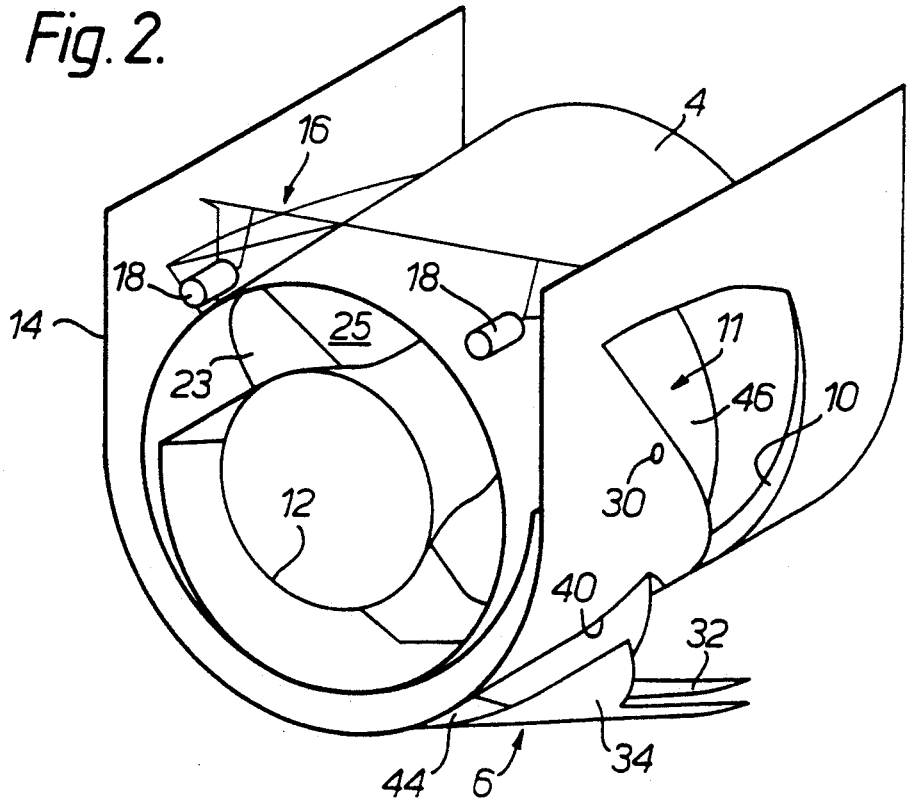
FIG. 2 shows the same view as FIG. 1 with the valve in the parallel flow position.

With reference to FIGS. 1 and 2 of the accompanying drawings, the basic changeover valve has only seven major components. Four of these are moving parts and three are static. The valve comprises: valve means in the form of a butterfly flap 2 for stemming flow along an air flow duct 4; secondary outlet means in the form of an ejector chute 6 which is located upstream of the valve means, the normal direction of air flow is indicated by arrow 8 and; secondary inlet means consisting of apertures 10 in the walls of duct 4 which may close by closure means in the form of two non-scoop doors 11, one on either side of the duct 4, located downstream of the valve means 2.

The static parts of the changeover valve referred to comprise: the flow duct 4, a transfer tube 12 coaxially with duct 4 and an outer shell or nacelle 14.

The transfer tube 12 simply encloses a drive shaft (not shown) to the front fan which has to pass through the changeover valve region. In addition the moving parts of the valve are operated by an arrangement 16 of pivoted links 16 shown in greater detail in FIGS. 5 and 6.

This actuating arrangement is driven by a pair of actuators 18 mounted on a structural casing (not shown) to which nacelle 14 is fixed. The region, indicated at 20, lying between the skin of nacelle 14 and the outer cylindrical wall of duct 4 constitutes a tertiary flow region.

The butterfly flap valve 2 is as described in the above mentioned earlier published European Patent Application No EP 0412736A1. Basically the valve comprises a valve member 2 housed within duct 4 and pivotable about an axis 22 lying transverse relative to the axis of duct 4. The valve member has a first, or open, position (FIGS. 1 and 3a) in which it lies in an axial plane causing virtually no flow obstruction, and a second, or blocking, position (FIGS. 2, 3b, 3c, 5 add 6) in which it lies obliquely across the transfer tube 4.

However, the valve member has to be adapted to accommodate transfer tube 12. It has, therefore an aperture in its central region through which the tube passes when the valve is deployed to block the duct 4. In plan view this aperture is elliptical in order to accommodate the tube when the valve is closed and, therefore, lying obliquely across duct 4. The inner periphery of the valve seals against surface of transfer tube 12. The axis 22 about which the valve member 2 rotates bisects the aperture on its minor axis.

The basic shape of the valve member 2 is complicated by a necessity for the valve to lie flush against the tube 12 in the non-obstructing position. Thus, the portions 23,24 of the member 2 lying alongside the tube 12 are joined by curved sections 25, 26 on either side of the valve axis 22 which follow the shape of the surface of the tube. A first curved portion 25 on the upstream side of the axis 22 passes above the tube 12, relative to its axial plane. A second curved portion 22 passes under the tube 12, that is on the opposite side of the axial plane. As the curved portions 25,26 are on opposite sides of the tube 12 the valve 2 can be rotated through a restricted arc only between its open and obstructing positions. The outer periphery of the valve member 2 thus does not follow a truly elliptical path. Its shape, however, is such that when the valve 2 is raised to obstruct flow in duct 4 the margin of the valve seals against the internal surface of the duct 4 at all points along its length. As illustrated the valve 2 has been designed to block flow in the parallel operating mode when raised 45° relative to its series operating position. In the series operating position the valve produces only about 1% of flow obstruction.

The butterfly flap is mounted on four bearings, two carried on the transfer tube 12, one of which is visible at 28, and on two bearings on the outer casing or nacelle 14, one of which his visible at 30.

The secondary outlet means 6 consists of a drop-down chute formed of inner and outer movable sections 32,34 belonging to the nacelle 14 and duct 4 respectively. In the series operating mode as in FIG. 1 the inner 32 of these two surfaces maintains a continuous flow surface in flow duct 4 between the front and rear engine fans. Meanwhile the outer section 34 provides a continuous nacelle flow surface. As previously mentioned the space between internal surface of nacelle 14 and the outer surface of duct 4 forms a tertiary flow region 20. The sections 32,34 of the drop-down chute maintain this spacing.

Switching to the parallel flow mode when the chute is lowered the section 32 provides a continuous flow surface for the front fan flow.

The inner chute section 32 has a lower curved and axially elongate portion 32a which forms part of the lower surface of duct 4. Towards its axially forward end 32b the lower portion of the inner chute is formed with a curved surface centred on a rotational axis 36. The curved surface profile is matched by an adjacent part of the wall of duct 4 so that upon rotation of the chute 32 surface continuity is maintained.

Side portions 32c of the chute 32 extend upwardly for slightly over half the diameter of duct 4. The chute 32 is mounted in bearings (not shown) carried towards the upper edges of chute side portions 32c for rotation about the axis 36. Axis 36 lies perpendicular to the longitudinal axis of duct 4, also tube 12 and parallel to rotational axis 22 of butterfly valve 2.

The shape and configuration of inner chute 32 exactly matches the shape of an exit aperture in the wall of duct 4. When the chute 6 is raised the inner chute 32 closes this aperture in edge-to-edge relationship to form the continuous flow surface of duct 4.

Figure 4A:
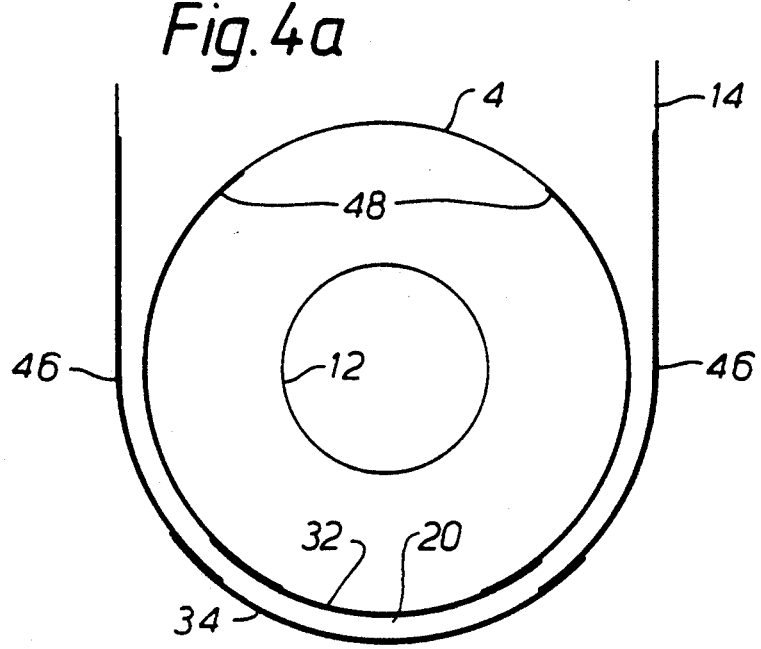
FIGS. 4a and 4b shows respectively two transverse sections through the changeover valve in the parallel position along lines 1—1 and 2—2 in FIG. 3c (Note: doors 11, inner 48 and outer 46 sections in particular, are exaggerated for understanding in FIG. 4a, however, the doors 11 are actually indistinguishable in practice as the inner and outer door skins lie flush with the nacelle 14 and duct 4 walls)
Figure 4B:
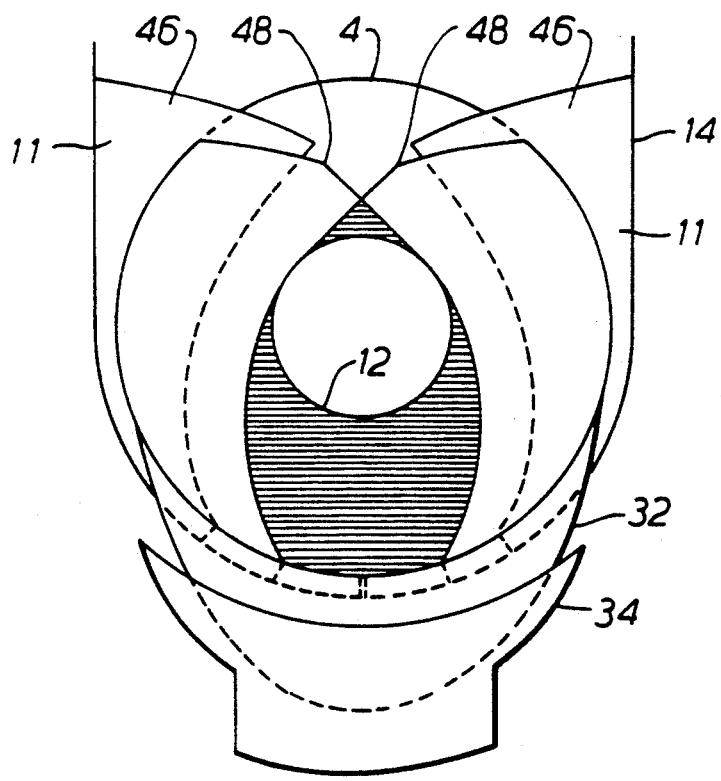

The outer chute section 34 is mounted in fixed relationship to inner chute section 32. It may be mounted on the outer face of section 32 in fixed spaced relationship by means of longitudinal vanes 38 in FIG. 4b. These vanes 38 act as a structural support between the inner and outer portions of the chute and also to guide flow in the space between the walls of duct 4 and nacelle 14.

The shape and configuration of outer chute 34 is not the same as the inner chute. Its shape is defined by the aperture in the corresponding aperture in nacelle 14 which is designed to permit passage therethrough of the distal portions of inner chute 32 when fully lowered. The total area of the aperture is determined by several of inter-related factors, for example mass flow rate and gas velocity.

When the chute 6 is in the raised position the space between the inner and outer sections 32,34 is in direct communication with the tertiary flow region 20. However, when the chute is lowered, see FIGS. 3b and 3c, the underface of inner chute is lowered, see FIGS. 3b and 3c, the underface of inner chute 32 abuts the forward edge 40 of the aperture in nacelle 14 which accommodates outer chute section 34, thereby stemming tertiary flow into the inter-chute section space.

With chute 6 pivoted about an axis 36 on inner section 32 when the chute is lowered then the outer section 34 is stepped away from the outer surface of nacelle 14. The forward lip 42 of section 34 is spaced from the nacelle 14 thereby forming a part annular flow intake 44 into the region between the inner and outer skin sections 32,34. Thus, a flow of air close to the surface of nacelle 14 is inducted into this space to exit the inter-section space at the downstream or distal end of the chute 6 thereby obviating, or at least substantially reducing, the base drag created by the lowered chute.

In the parallel mode the chute is lowered through an angle of approximately 15°. It is located on two bearings on the structural casing on a horizontal plane through the centre line of the engine.

The secondary intake means comprises of a pair of inwardly pivoting doors 11. Each of these doors is also double-skinned and consists of movable outer section 46 of nacelle wall 14 and a movable inner section 48 of duct wall 4. When the doors are closed the sections completely fill correspondingly shaped apertures in the nacelle 14 and duct 4.

In the series operating mode, the doors 11 are closed and inner sections 48 provide a continuous flow surface between the front and rear fans. Meanwhile outer sections 46 provide a continuous surface for nacelle 14.

In the parallel operating mode, the doors 11 open inwardly, each pivoting about a hinge line 50 located towards the forward edges of the doors. They pivot inwardly until the distal edges of the inner door sections 48 butt against the transfer tube 12. The inner door sections 48 also meet at 51 in a place through the longitudinal axis of the duct 4 and vertically above the centre line. The inner door sections are shaped so as to meet along a short line. The outer sections provide a continuous flow surface from the exterior surface of nacelle 14 into the annular flow region of duct 4 downstream of the butterfly valve 2 and immediately in front of the rear fan.

The inner door sections 48 are mounted in fixed spaced relationship to the outer door sections 46 by means of structural load bearing members (not shown) which lie between the two skins. When the doors are closed the space between the inner and outer sections 46,48 is in direct communication with the tertiary flow region 20.

The space between the door sections 30,32 remains, when the doors are open, in direct communication with the tertiary flow region between nacelle 14 and flow duct 4.

However, in the open position the forward edges of inner sections 48 break away from the adjacent edge of the door aperture in the duct 4. Thus, an aperture is opened for tertiary flow to reach an otherwise stagnant region inside duct 4 and bounded by the butterfly valve 2 and the insides of inner door sections 48. This stagnant region may adversely affect pressure at the entry face of the second of the tandem fans and could result in compressor surge. Tertiary flow into the stagnant space and through the space between the door sections will help alleviate this.

Further relief of the stagnant flow region in the parallel flow operating condition is obtained by allowing a proportion of air exiting the front fan to by-pass the butterfly valve. This further improvement may be carried into practice as illustrated by a dashed line 52 around the outer margins of butterfly valve sections 23, 24, 25 and 26. The valve sections are formed with a crenellated edge to allow by-pass flow when the valve is raised. According to the amount of by-pass flow required the outer edges only of the valve sections adjacent duct 4 may be crenalated, or far greater flow those edges adjacent tube 12 also.

Figure 3A:
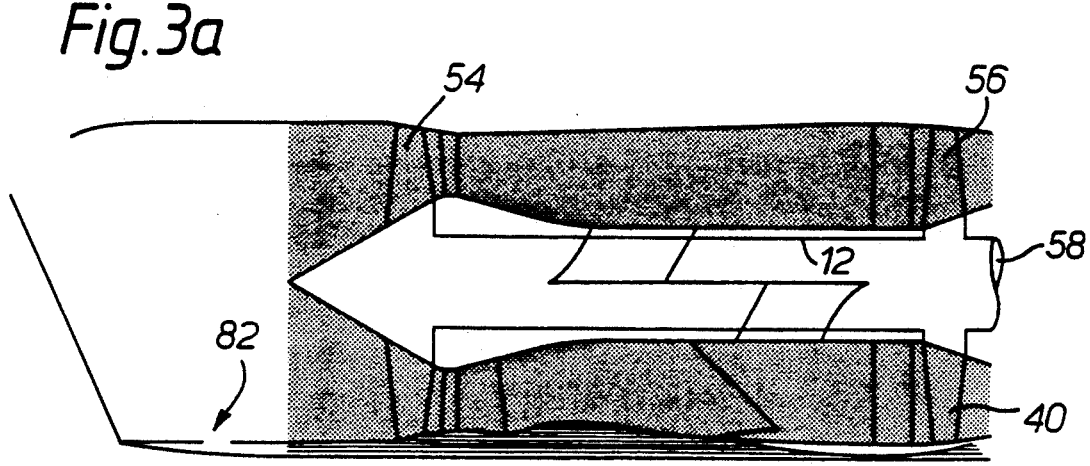
FIGS. 3a, 3b and 3c shows a longitudinal section of the valve of FIGS. 1 and 2 illustrating in FIG. 3a the series airflows and in FIGS. 3b and 3c the parallel airflows.
Figure 3B:
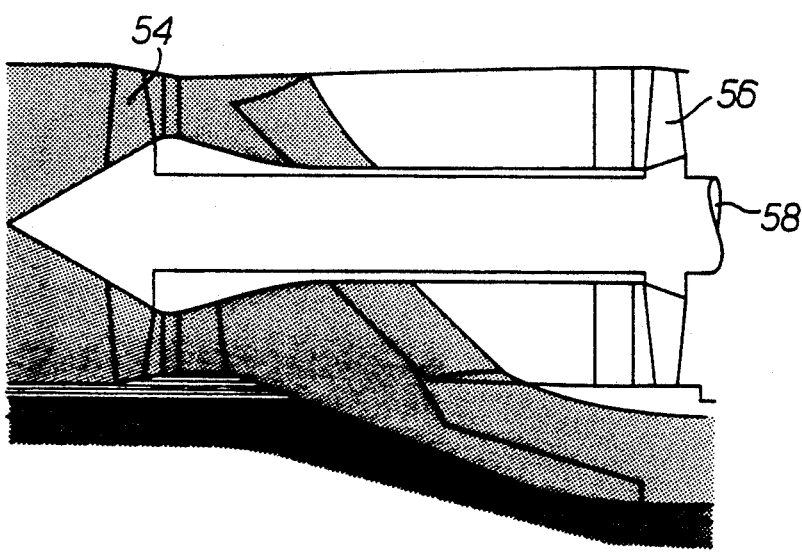
Figure 3C:
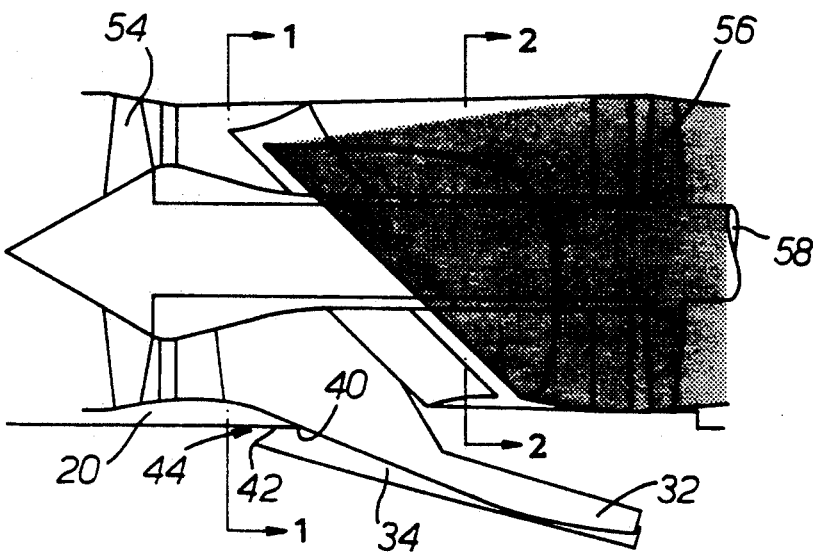

The shape of the secondary inlet doors is roughly triangular in side view, see FIG. 3c for example. The shape is effectively determined by the angle of the butterfly valve 2 in the blocking position and the intersection of the joining surface between the rear fan intake door and the nacelle. The front and proximal edges of the doors 11 are disposed as close to the line of the raised butterfly flap 2 as practically possible. These edges are therefore inclined, relative to a horizontal plane containing the longitudinal axis of the valve duct 4, at an angle of 45°. The doors pivot about a compound hinge line indicated at 50 in FIGS. 5 and 6 which allows them to rotate inwards through an angle of approximately 40°. The trailing edges of the doors 11, when open butt against the transfer tube 12. The upper corners of the doors also closely approach, and may actually be designed to touch, effectively forming an arch over the transfer tube 12 as can be seen in the axial view of FIG. 4b. They provide a continuously contracting flow area into the rear fan entry annulus.

To achieve minimum pressure loss with a flush intake aperture, that is a pressure loss no worse than a figure in the range 3% to 10%, the total intake door area at the nacelle surface must be approximately 150% of the rear fan entry area.

The airflow achieved during series and parallel modes of operation are illustrated in FIGS. 3a, 3b and 3c with reference to a longitudinal vertical section through the valve. The front fan is shown at 54 and the rear fan at 56. These two fans are driven in tandem by a common shaft 58 housed within transfer tube 12.

The transfer tube 12 cooperates with the outer flow duct wall 4 to form a smooth annular flow passage between the two fans, within which is housed the changeover valve 2 aft of the front fan. The transfer tube 12 reduces in diameter to match the inner diameter of the rear fan entry annulus. This reduction is achieved over the shortest length which will maintain lamina flow. Thus, it allows maximum expansion between the fans in series and reducing the amount of blockage in the parallel operating mode.

The transfer tube is rigidly supported towards either and, by guide vane annulus at the front end and by a plurality of struts or rear fan inlet guide vanes spaced apart around the flow annulus at the rear end. The tube 12 is subject to an axial load exerted by butterfly flap 2 in the parallel load, i.e. when it is raised to stem flow in the duct 4.

Operation of the drop-down ejector chute 6 and intake doors 11 is controlled by a pair of actuators 18 mounted on top of the duct 4, which constitutes the main structural casing of the changeover valve section. The actuators 18, two are provided for redundancy, are mounted on either side of the duct casing 4 and are connected to the chute and intake doors by a link arrangement generally indicated at 16. The arrangement is identical on both sides of the valve.

Figure 5:
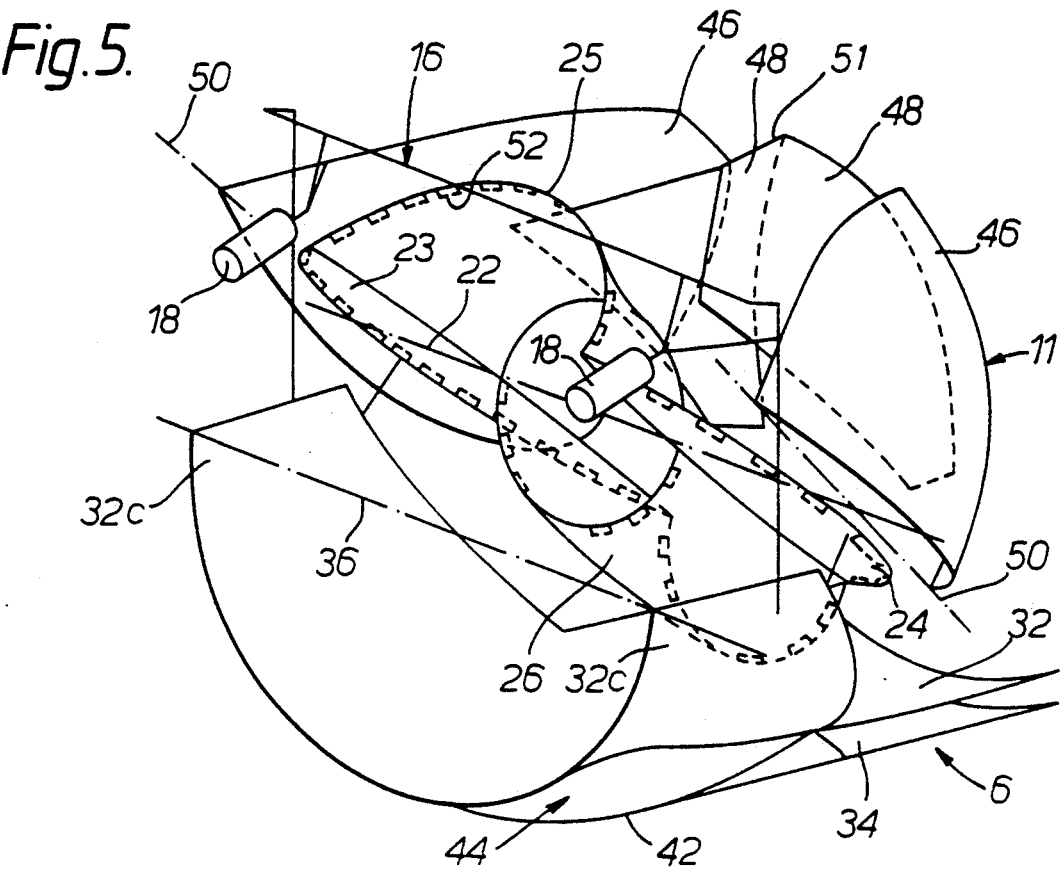
FIG. 5 is an isometric view of the moving parts of the changeover valve and actuating mechanism illustrating the relationship between the butterfly valve, secondary intake doors and the ejector chute.
Figure 6:
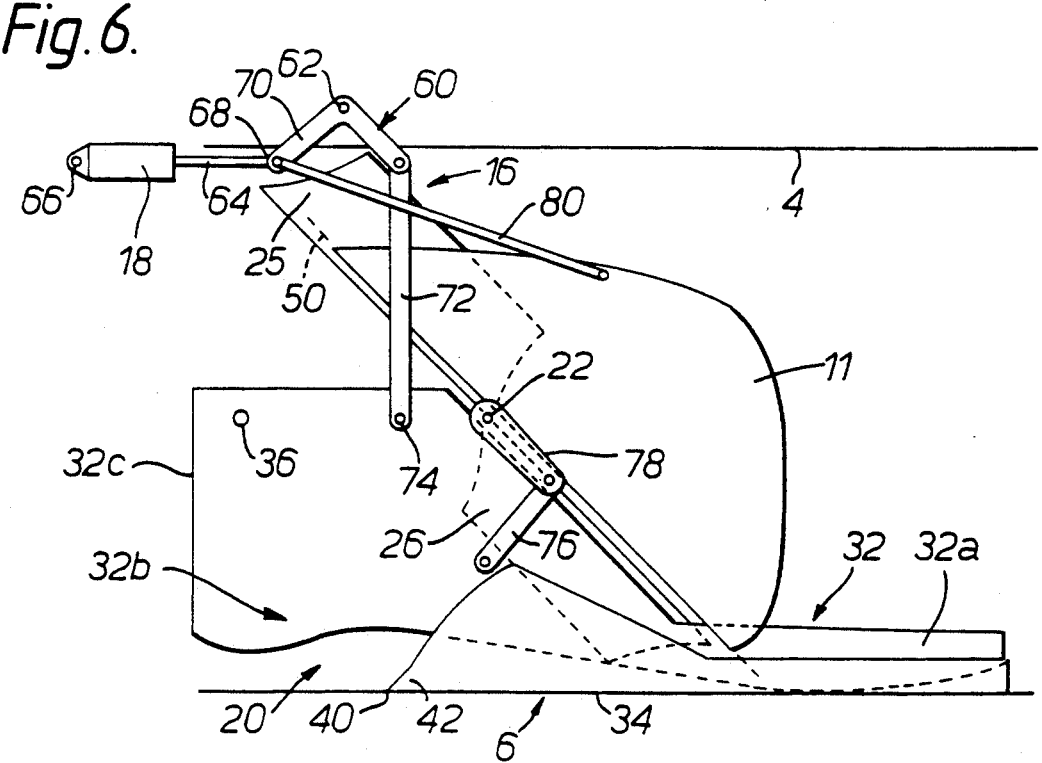
FIG. 6 shows a side view of the components of FIG. 5.

FIGS. 5 and 6 show respectively an isometric view and a side view of the moving parts and operating linkage of the changeover valve. Deployment of the moving parts, that is of butterfly flap valve 2, drop-down chute 6 and drop-in doors 10, is controlled by bell crank levers 60 located at either side of the valve and pivoted about an earthed pivot 62. Cranks 60 are driven by a linear stroke actuators 18 through actuator output rods 64. The necessary compliance required of actuators 18 to accommodate the arcuate movement of cranks 60 is provided by pivotally mounting the actuators on fixed parts of the structure at 66. The actuator rods 64 are pivotally connected to one end 68 of a first arm 70 of cranks 66.

Drop-down chute 6 is pivotally mounted on the fixed structure of the valve about an axis 36 passing through the centre-line of the transfer duct 4. Connecting rods 72 are pivotally connected to the distal ends of second arms of cranks 60 and to the either side of the side walls of chute 6 at points 74 spaced a short distance from pivots 36.

Butterfly flap valve 2 is similarly mounted on the fixed structure of the changeover valve a little way downstream of the chute 6. The flap valve 2 is also pivotally mounted about an axis 22 parallel with axis 36 and in the same plane thereas. Drive is imparted to the valve through a further link 76 pivotally mounted on chute 6 at one end and to a crank 78 at its other end. Valve crank 76 is fixed to the valve pivot outside duct 4 but within the space between the duct wall and the nacelle wall.

In FIG. 6 only one drop-in door 11 is shown and then only the outer skin made up of part of the nacelle wall. This door is pivotable about an axis 50 which is inclined at a compound angle with respect to orthogonal planes, one in the plane of the drawing and the other perpendicular to it, which intersects along the axis of duct 4. Each of the doors 11 is operated by a link 80 from the first end 68 of actuator crank 60 pivotally attached to a door 11 at a point mid-way along its uppermost edge.

Thus, all moving parts of the changeover valve are connected with the actuators 18 and move in unison when the actuators are energised.

In normal propulsion unit cruise configuration the changeover valve is as shown in FIG. 1 and has an airflow pattern as depicted in FIG. 3a. That is, the butterfly flap valve 2 is lowered to present minimum obstruction to axial flow along duct 4. Drop-in doors 11 in the sides of the duct and nacelle are closed presenting continuous flow surfaces internally and externally. Similarly drop-down chute 6 is raised for the same profile. There are two main airflows: a core engine flow acted on by first stage fan is routed entirely to second fan stage along duct 4. A tertiary flow served from an intake bleed 82 (FIG. 3a) flows in the space between duct 4 and the nacelle wall 14.

In high bypass ratio configuration flap valve 2 is raised to obstruct duct 4 and drop-down chute 6 is lowered to open a secondary outlet. The result is illustrated in FIG. 3b. Primary intake air passes through first fan stage, encounters the oblique obstruction of valve 2, is diverted towards the secondary outlet aperture and is ejected via chute 6. The tertiary airflow is partially blocked by the inner skin of chute 6 which prevents tertiary air escaping.

Meanwhile drop-in doors 10 open to create a secondary inlet on the downstream side of valve 2 producing the airflow pattern illustrated in FIG. 3c. Air flows inwards through the secondary inlets towards second fan stage. This airflow supplies the core engine. Furthermore the space between inner and outer skins of doors 11 remains in direct communication with the tertiary flow region so that a subsidiary airflow is maintained into the volume bounded by the downstream side of valve 2 and the back of the intake doors 11. This region is shaded in FIG. 4c, and the tertiary airflow helps to fill-in the region of the second fan face shadowed by the drop-in doors.

We claim:

1. A changeover valve for controlling flow in a duct comprising:
    valve means for stemming flow along the duct;
    secondary outlet means upstream of the valve means and operative in synchronism with said valve means to exhaust flow entering an upstream end of the duct when said valve means blocks flow along the length of the duct;
    secondary inlet means downstream of the valve means and operative in synchronism with said valve means to admit a secondary flow into the duct when said valve means blocks flow along the length of the duct;
    said secondary inlet means comprising two inlet apertures formed in opposite sides of the duct, each inlet aperture being closable by closure means comprising a single door hinged about its upstream edge to open inwards into the duct each door being hinged about a hinge line inclined relative to a longitudinal axis of the duct and a direction of flow in the duct, wherein the flow duct comprises concentric inner and outer walls which define between them an annular flow region, the doors of the closure means each having a distal edge, the doors being dimensioned and mounted such that when opened inwards the distal edges of the doors lie adjacent the radially innermost wall defining the annular flow region.

2. A changeover valve as claimed in claim 1, wherein the secondary inlet means has a total entry area of not less than approximately 150% of a cross sectional area of a downstream end of the duct.

3. An improvement to a tandem fan gas turbine engine comprising a first fan compressor stage located within a flow duct, a second fan compressor stage located within the duct downstream of the first fan stage, includes between the fan stages and within the duct a changeover valve for controlling flow in the duct, the improvement being a valve comprising:
    valve means deployable to stem flow along the duct from the first fan stage to the second fan stage;
    secondary outlet means upstream of the valve means and operative in synchronism with said valve means to exhaust flow from the first fan stage when said valve means is deployed to block flow along the length of the duct;
    secondary inlet means downstream of the valve means and operative in synchronism with said valve means to admit a secondary flow to the second fan stage when the valve means blocks flow along the length of the duct;
    said secondary inlet means comprising two inlet apertures formed in opposite sides of the duct, each inlet aperture being closable by closure means comprising a single door hinged about its upstream edge to open inwards into the duct, each door being hinged about a hinge line inclined relative to the longitudinal axis of the duct and the direction of flow in the duct, wherein the flow duct comprises concentric inner and outer walls which define between them an annular flow region, the doors of the closure means each having a distal edge, the doors being dimensioned and mounted such that when opened inwards the distal edges of the doors lie adjacent the radially innermost wall defining the annular flow region.

4. A tandem fan engine as claimed in claim 3, wherein the tandem fan engine is enclosed within an engine nacelle and the secondary inlet means and the secondary outlet means include apertures in the engine nacelle wall.

5. A tandem fan engine as claimed in claim 4, wherein the secondary inlet means includes inlet apertures on opposite sides of the engine nacelle.

6. A tandem fan engine as claimed in claim 3 wherein the secondary inlet means has a total entry area not less than approximately 150% of the area of an entry face of the second fan stage.

* * * * *